(12) United States Patent
Ehrenleitner et al.

(10) Patent No.: US 7,249,924 B2
(45) Date of Patent: Jul. 31, 2007

(54) RACK SERVING UNIT

(75) Inventors: Franz Ehrenleitner, Stuttgart (DE); Thomas Dehm, Reutlingen (DE)

(73) Assignee: Eisenmann Maschinenbau KG (Komplementar: Eisenmann-Stiftung) (DE)

( * ) Notice: Subject to any disclaimer, the term of this patent is extended or adjusted under 35 U.S.C. 154(b) by 474 days.

(21) Appl. No.: 10/708,053

(22) Filed: Feb. 5, 2004

(65) Prior Publication Data

US 2004/0234364 A1    Nov. 25, 2004

(30) Foreign Application Priority Data

Feb. 5, 2003    (DE) ................ 103 04 580

(51) Int. Cl.
*B65G 1/00* (2006.01)
(52) U.S. Cl. .................... 414/266; 212/272
(58) Field of Classification Search ........ 212/272, 212/273; 414/266, 281, 626
See application file for complete search history.

(56) References Cited

U.S. PATENT DOCUMENTS

| | | | |
|---|---|---|---|
| 2,457,135 A * | 12/1948 | Deiters | 414/626 |
| 4,820,109 A | 4/1989 | Witt | |
| 4,838,749 A * | 6/1989 | Potocjnak | 414/277 |
| 5,051,051 A * | 9/1991 | Grabill | 414/282 |
| 5,226,782 A | 7/1993 | Rigling | |
| 5,281,070 A * | 1/1994 | Stolzer | 414/281 |
| 2005/0042063 A1 * | 2/2005 | Ehrenleitner | 414/266 |

FOREIGN PATENT DOCUMENTS

| | | |
|---|---|---|
| DE | 25 53 221 | 6/1977 |
| DE | 43 03 203 A1 | 8/1994 |
| DE | 199 20 923 A1 | 11/2000 |
| DE | 202 05 633 U1 | 8/2002 |

OTHER PUBLICATIONS

F.A. Brockhaus, Brockhaus Die Enzyklopadie, 1998, p. 258, vol. 22, F.A. Brockhaus Leipzig Mannheim, Stichwort:: TRANSLATION.
Duden, The extensive encyclopedia of the German language, 1981, p. 2615, Bibliographisches Institute AG, Mannheim. Stichwort:: TRANSLATION.

* cited by examiner

*Primary Examiner*—James Keenan
(74) *Attorney, Agent, or Firm*—Factor & Lake

(57) ABSTRACT

A rack serving unit comprises a carriage which may be moved along a rack aisle on substantially horizontal carrying rails. Carried along by the carriage there is a lifting platform which is suspended on the carriage by way of at least two traction mechanisms, preferably cables, and may be moved in the vertical direction with respect to the carriage. To stabilise the lifting platform against undesired lateral movements, a stabilising device is provided which comprises at least one guide element extending substantially horizontally parallel to the translatory movement path of the lifting platform. This guide element is in constant engagement with the lifting platform in such a way that the position of this latter in the direction of the translatory movement is constantly defined. Provided at both ends of the translatory movement path, there is a lifting device for each guide element by means of which the guide element may be moved synchronously with the lifting platform in the vertical direction.

10 Claims, 7 Drawing Sheets

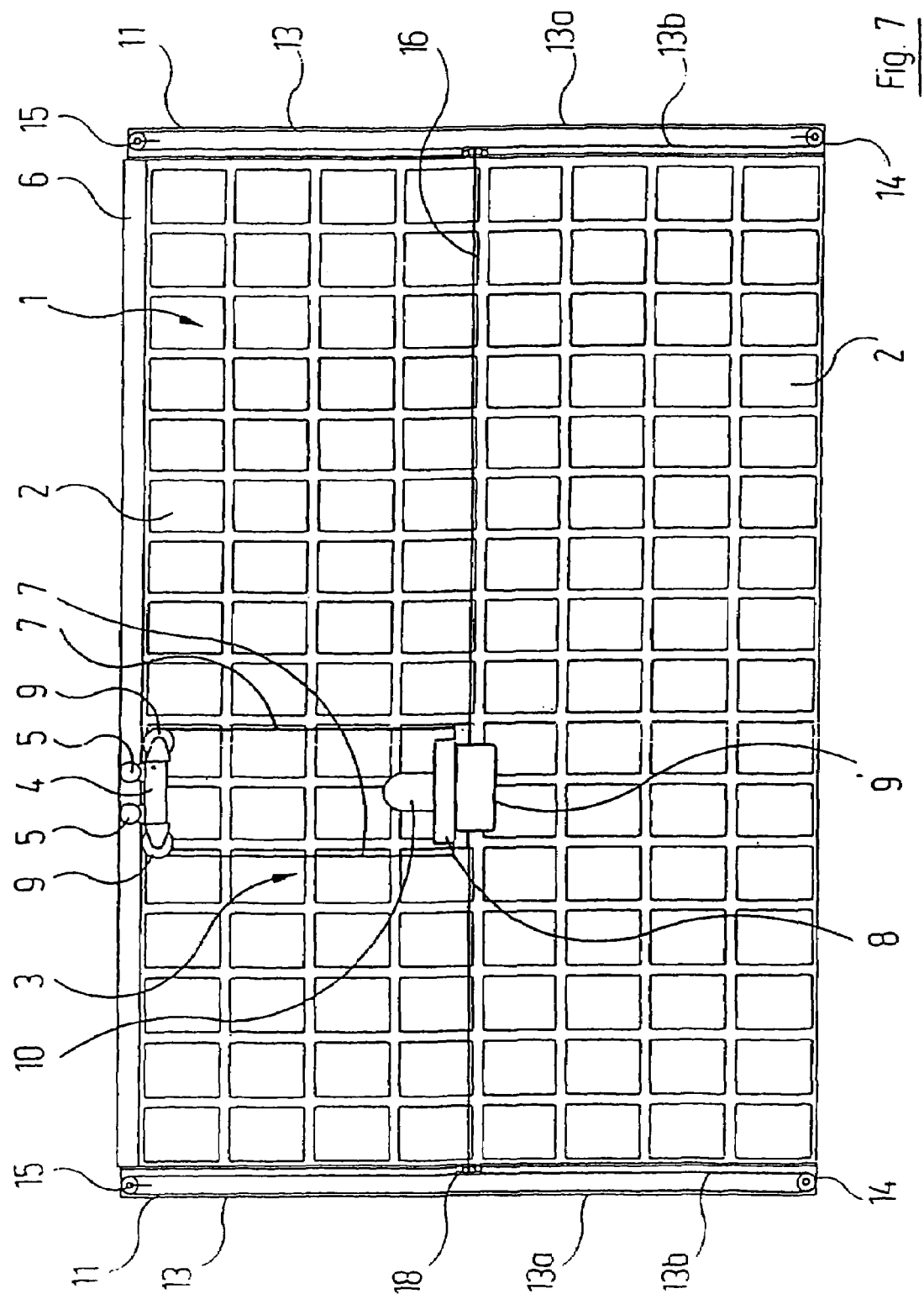

RACK SERVING UNIT

SUMMARY OF INVENTION

The invention relates to a rack serving unit having:

a) a carriage which may be moved along a rack aisle by means of a drive on at least one substantially horizontal carrying rail;

b) a lifting platform which is carried along by the carriage for the purpose of receiving warehouse goods;

c) a lifting device by means of which the lifting platform may be moved in the vertical direction with respect to the carriage; and d) a stabilising device which prevents the lifting platform from swinging out laterally with respect to the carriage.

Rack serving units of this type serve for storing warehouse goods in compartments of high-bay racks and removing them from these again. The high-bay racks here extend along a rack aisle in which the rack serving unit may be moved. To achieve a high loading and unloading rate of the warehouse goods, and therefore to minimise the overall size of the high-bay warehouse required for a particular capacity, the speed at which the lifting platform may be moved out of one position into another has to be as great as possible. Since the accelerated mass and the connecting device which connects the lifting platform to the carriage form an oscillatory system, fast acceleration generally also means that the lifting platform is at risk of oscillating greatly.

In addition to the carriage, which is generally movable on the floor of the room, known rack serving units of the type mentioned at the outset therefore have a massive column for stabilising the lifting platform, on which the lifting platform is guided during its vertical movement. Large masses are necessary to achieve the necessary rigidity of the guide column. Rack serving units of this type can reach an overall weight of 25 tons. It is clear that enormous drive powers are required to enable these rack serving units to be operated with rapid acceleration. In spite of the massive guide columns, there are considerable problems related to oscillation since the high masses cause the natural frequencies of the oscillatory system to be relatively low.

The object of the present invention is to construct a rack serving unit of the type mentioned at the outset in such a way that the lifting platform may be accelerated very rapidly and problems of oscillation are minimised.

According to the invention, this object is achieved in that:

e) the lifting device for the lifting platform comprises at least two traction mechanisms on which the lifting platform is suspended from the carriage;

f) the stabilising device comprises:

fa) at least one guide element, which extends substantially horizontally parallel to the translatory movement path of the lifting platform and with which the lifting platform is in constant engagement in such a way that its position in the direction of the translatory movement is constantly defined; and fb) provided at both ends of the translatory movement path of the lifting platform there is a lifting device for each guide element, which is connected to the guide element and is constructed in such a way that the guide element moves synchronously with the lifting platform in the vertical direction in substantially horizontal alignment.

Consequently, according to the invention, care is taken to ensure that all accelerated masses of the rack serving unit, particularly the mass of the lifting device for the lifting platform and the mass of the stabilising device, are as small as possible. Small masses mean low forces and low drive powers, which are necessary to accelerate the lifting platform. Since the lifting platform moves quickly, it is possible to increase the capacity of the high-bay warehouse or to reduce its dimensions whilst maintaining the same capacity. Since the accelerated masses are at the same time masses of the above-mentioned oscillatory system, the natural frequencies move into higher values, where they are more easily controllable. The lifting device used according to the invention, which comprises at least two traction mechanisms, has the smallest conceivable mass. The same applies to the stabilising device, which only comprises the at least one guide element and the secondary unit associated therewith. As long as the guide element is flexible, it can be held very taut so that the spring constant of the spring of the oscillatory system is very great and the frequency of the natural oscillations of this system is therefore also very high.

In a preferred embodiment of the invention, the lifting platform is in engagement with the guide element by way of at least one clamp-roller drive having two clamp rollers which abut under pressure against opposite faces of the guide element and of which at least one may be driven such that the lifting platform executes a translatory movement synchronously with the carriage. In this embodiment, the lifting platform having the clamp-roller drive has, to some extent, its own drive source which acts on the guide element moving with the lifting platform in the air.

The guide element is preferably a flat belt. On the one hand, this weighs relatively little and, on the other hand, it can be tensioned such that it is very taut, as already mentioned above.

Alternatively, it is however also particularly possible to consider using a cable as the guide element. In this case, to improve the frictional fit, it is recommended that at least one clamp roller of the clamp-roller drive has a groove for receiving the cable.

The guide element can also be a cable which extends from one lifting device to the other lifting device and, between the lifting devices, is wound with frictional fit around a driven cable drum carried by the lifting platform.

In an alternative embodiment of the invention, the guide element comprises two cables which each extend to the lifting platform from one of the two lifting devices associated with the guide element and may each be wound onto a driven cable drum in such a way that the lifting platform executes a translatory movement synchronously with the carriage and both cables are constantly taut. It is also possible here for the cable drums to represent a separate drive source for the translatory movement of the lifting platform, the tautness of the two cables preventing the lifting platform from swinging out laterally.

As the lifting device for the guide element, it is possible to provide a continuous belt having a vertically extending strand to which a respective end of the guide element is fixed. As long as the guide element is not very long and the continuous belt moves with a low degree of friction, it is not absolutely necessary to drive one of the idle rollers of the continuous belt. Instead, in this case, the lifting carriage takes the continuous belt along with it during its vertical movement.

However, it is generally recommended for the continuous belt to be drivable.

In a preferred embodiment of the invention, at least the vertically extending strand of the continuous belt is arranged within a vertically extending guide profile and is connected to the associated end of the guide element by way of a connecting device which has at least one guide roller, the guide roller rolling along an inner face of the guide profile.

Here, an "inner" face is also understood to mean that face of the guide profile which faces in the opposite direction to the direction in which the guide element extends. The tensile force of the tensioned guide element is thus introduced into the guide profile by way of the guide roller.

Particularly stable conditions for the lifting platform are produced if two guide elements extending parallel to one another are provided, which may be moved vertically such that they are synchronous with one another and with the lifting platform.

For weight-related reasons, it is preferable if the traction mechanisms on which the lifting platform is suspended from the carriage are flexible, in particular cables, belts or chains.

BRIEF DESCRIPTION OF DRAWINGS

An exemplary embodiment of the invention is explained in more detail below with reference to the drawing, which shows:

FIG. 7 a side view of an alternative embodiment of the present invention;

DETAILED DESCRIPTION

Figure 1:
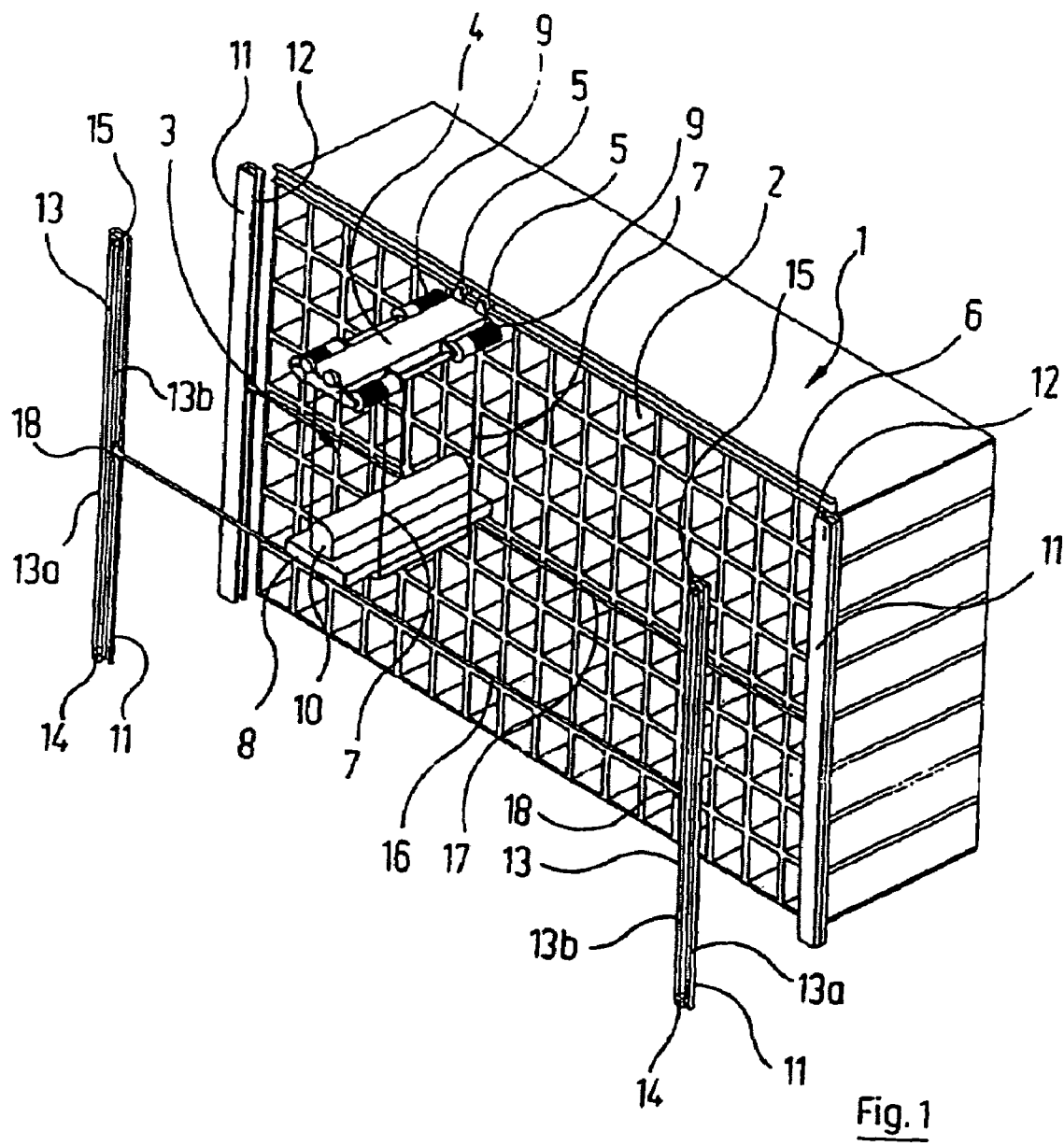
FIG. 1 a perspective view from above right of a rack serving unit according to the invention in front of a high-bay rack.

In the drawing, reference numeral 1 denotes a conventional high-bay rack which comprises a steel construction and has a plurality of rack compartments 2 in which warehouse goods 10 can be stored. Warehouse goods 10 are stored in the rack compartments 2, and warehouse goods 10 are removed from these rack compartments 2, by a rack serving unit 3 which may be moved in a rack aisle between the high-bay rack 1 illustrated in FIG. 1 and a corresponding high-bay rack which, it is to be imagined, is parallel in front of this.

The rack serving unit 3 comprises a carriage 4, which is provided on opposite sides with a respective pair of driven carrying rollers 5. Each pair of carrying rollers 5 runs in a carrying rail 6, which is fixed to the upper edge of the corresponding high-bay rack 1 and extends substantially horizontally.

A lifting platform 8 is suspended from the carriage 4 by way of four cables 7. Driven cable drums 9 on the carriage 4 receive the upper end region of the cables 7 so that, by winding the cables 7 on and off the cable drums 9, it is possible to alter the vertical position of the lifting platform 8 with respect to the carriage 4.

The lifting platform 8 carries the warehouse goods 10 and, according to the commands from a control, can be moved in front of each rack compartment 2 as a result of a horizontal translatory movement of the carriage 4 and a vertical movement with respect to the carriage 4 in order to either store the warehouse goods 10 in said rack compartment or remove them therefrom.

The warehouse goods 10 should be transported to the target positions as quickly as possible. This means that the carriage 4 having the lifting platform 8 carried along by it has to be accelerated to high speeds, and slowed down again, as quickly as possible. A stabilising device is provided to prevent the lifting platform 8 from being deflected laterally, and particularly oscillating, during these movement procedures. This stabilising device comprises two vertical, hollow guide profiles 11 at both lateral ends of the high-bay rack 1, the basic cross-sectional shape of said hollow guide profiles being rectangular. The mutually facing sides of the guide profiles 11 each have a respective vertical slot 12 extending through them.

Only the rear halves of those guide profiles 11 which are closer to the observer in FIG. 1 are shown. It is thus possible to see that a respective continuous belt 13 having an elongated, parallel, vertical strand 13a, 13b is arranged inside the guide profiles 11, said strand running around a respective idle roller 14 and 15 at the top and bottom. One of these idle rollers 14, 15 is driven, for example the lower idle roller 14.

Figure 6:
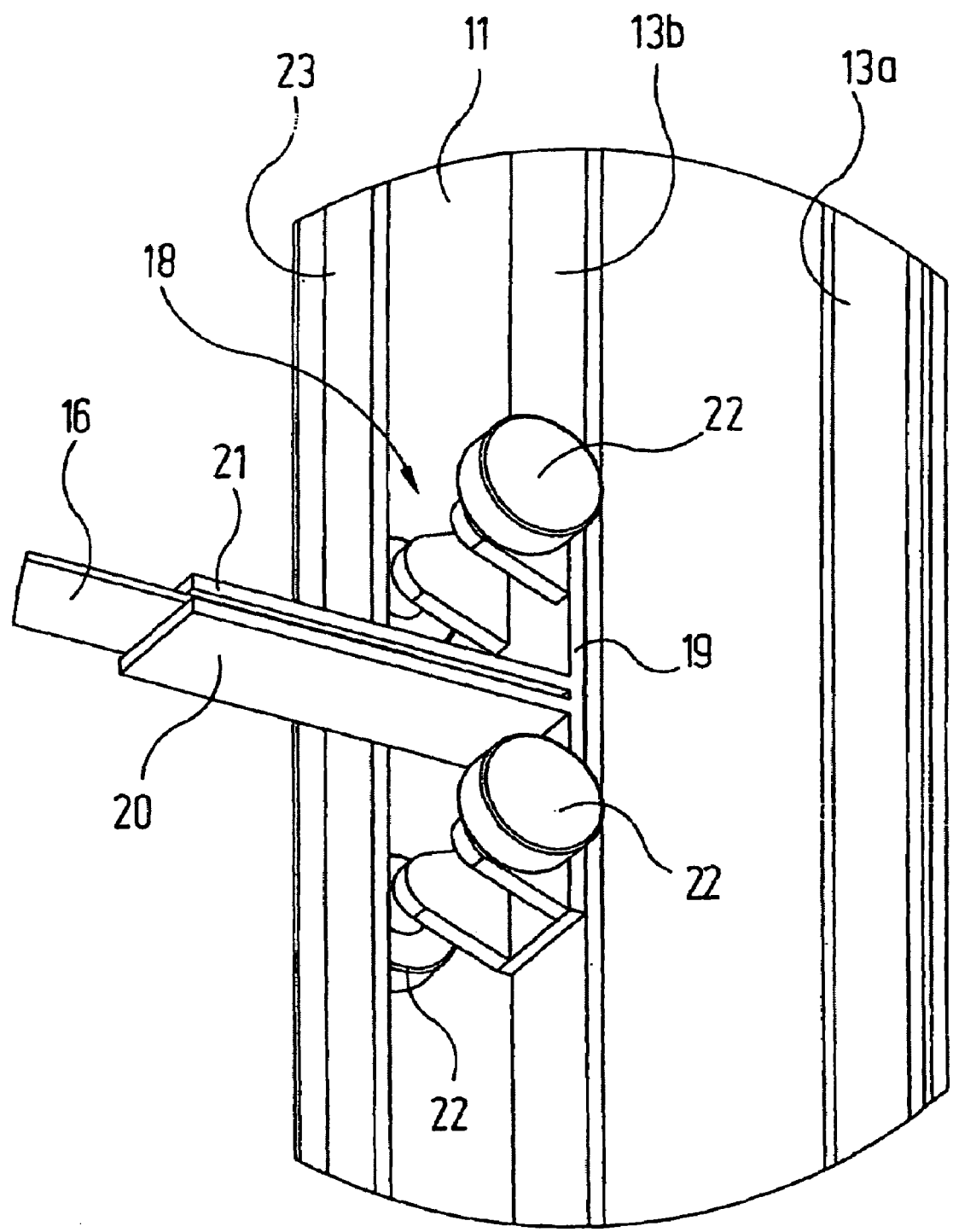
FIG. 6 a detailed view of a tensioning device for a horizontal guide belt, which is used in the rack serving unit in FIGS. 1 to 5.

Running between the pairs of continuous belts 13 at opposite sides of the high-bay rack 1, there are two substantially horizontal guide belts 16, 17 which are fixed to the corresponding continuous belts 13 by the clamping device 18 illustrated in FIG. 6. On a base part 19, which extends vertically and is connected to the continuous belt 13 in a manner not illustrated, this clamping device 18 comprises two parallel horizontal clamping flanges 20, 21, between which the end of the guide belt 16 is fixed and which each extend through the slot 12 in the guide profile 11. Moreover, above and below the clamping flange 21 within the guide profile 11, the base part 19 carries two pairs of guide rollers 22 which each roll along those guide flanges 23 of the guide profile 11 which are located alongside the slot 12, (in FIG. 6 only one of these guide flanges 23 is illustrated). The guide belts 16, 17 extending between opposing guide profiles 11 are held taut in horizontal alignment with the aid of the clamping devices 18.

Figure 2:
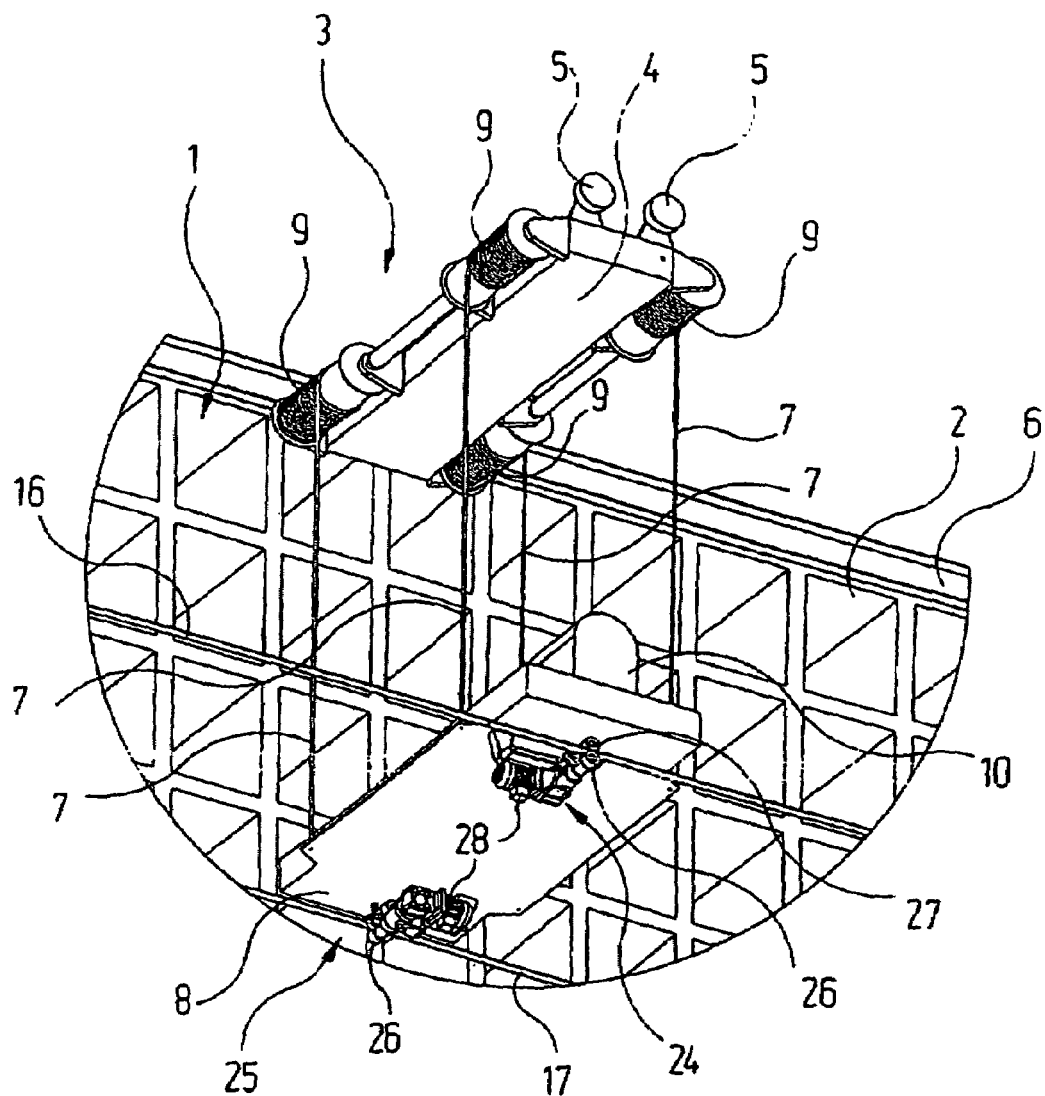
FIG. 2 a perspective view from below left of the rack serving unit in FIG. 1, on a somewhat enlarged scale.

As shown in particular in FIG. 2, two clamp-roller drives 24, 25, of which one (24) cooperates with the guide belt 16 and the other (25) cooperates with the guide belt 17, are located on the underside of the lifting platform 8. Each clamp-roller drive 24, 25 comprises two clamp rollers 26, 27, which abut against opposite sides of the associated guide belt 16 or 17 under corresponding clamping pressure. At least one of these clamp rollers 26, 27 is driven by a geared motor 28. The outer surface of the clamp rollers 26, 27 is made of a material which ensures a good frictional fit with respect to the surface of the corresponding guide belt 16, 17.

The drive which takes care of the horizontal movement of the carriage 4, the drives which activate the cable drums 9, the drives which set the idle rollers 14 in motion and also the geared motors 28 are connected to a central control of the system and receive their commands from this.

Figure 3:
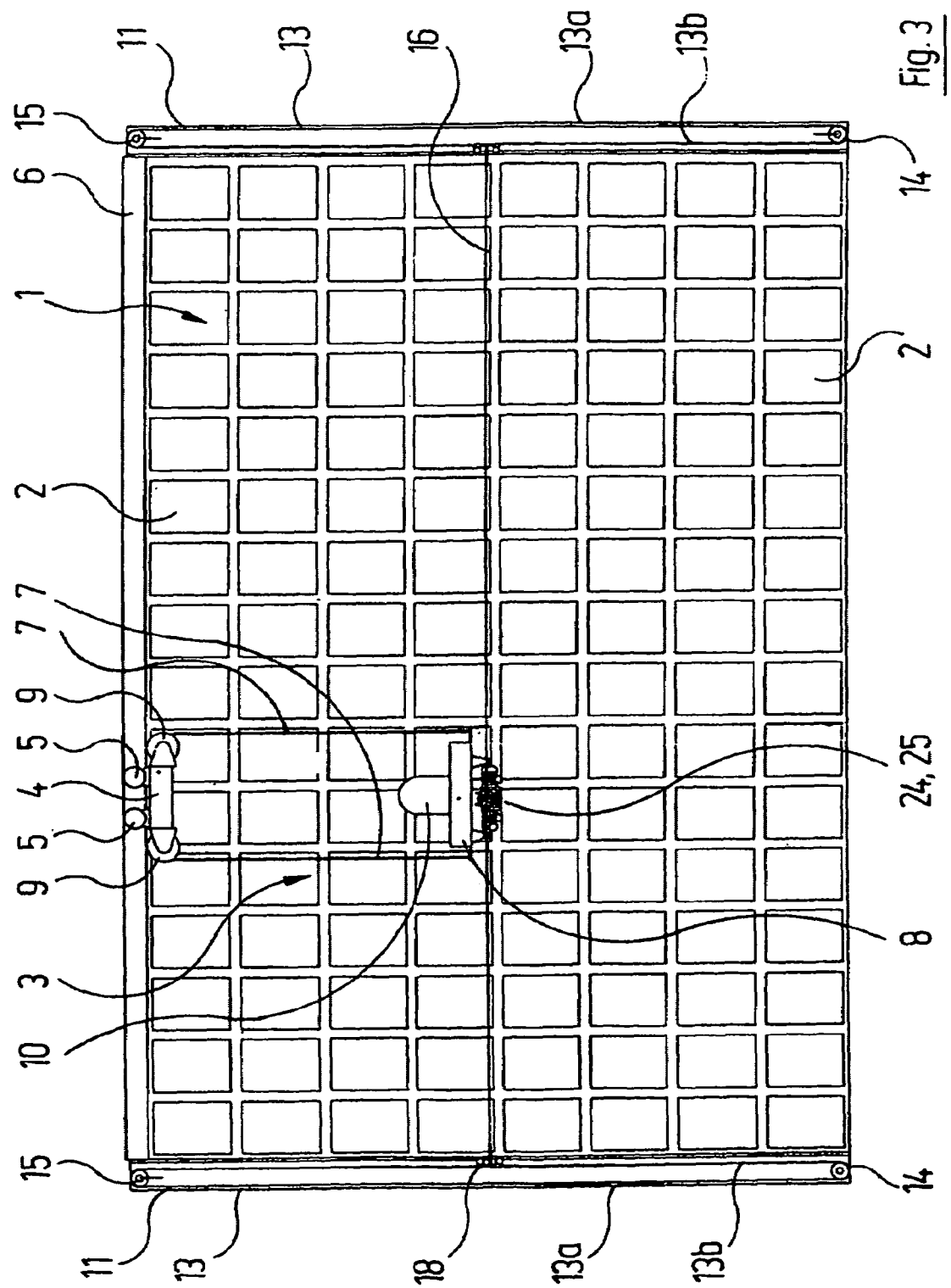
FIG. 3 a side view of the rack serving unit in FIGS. 1 and 2.
Figure 4:
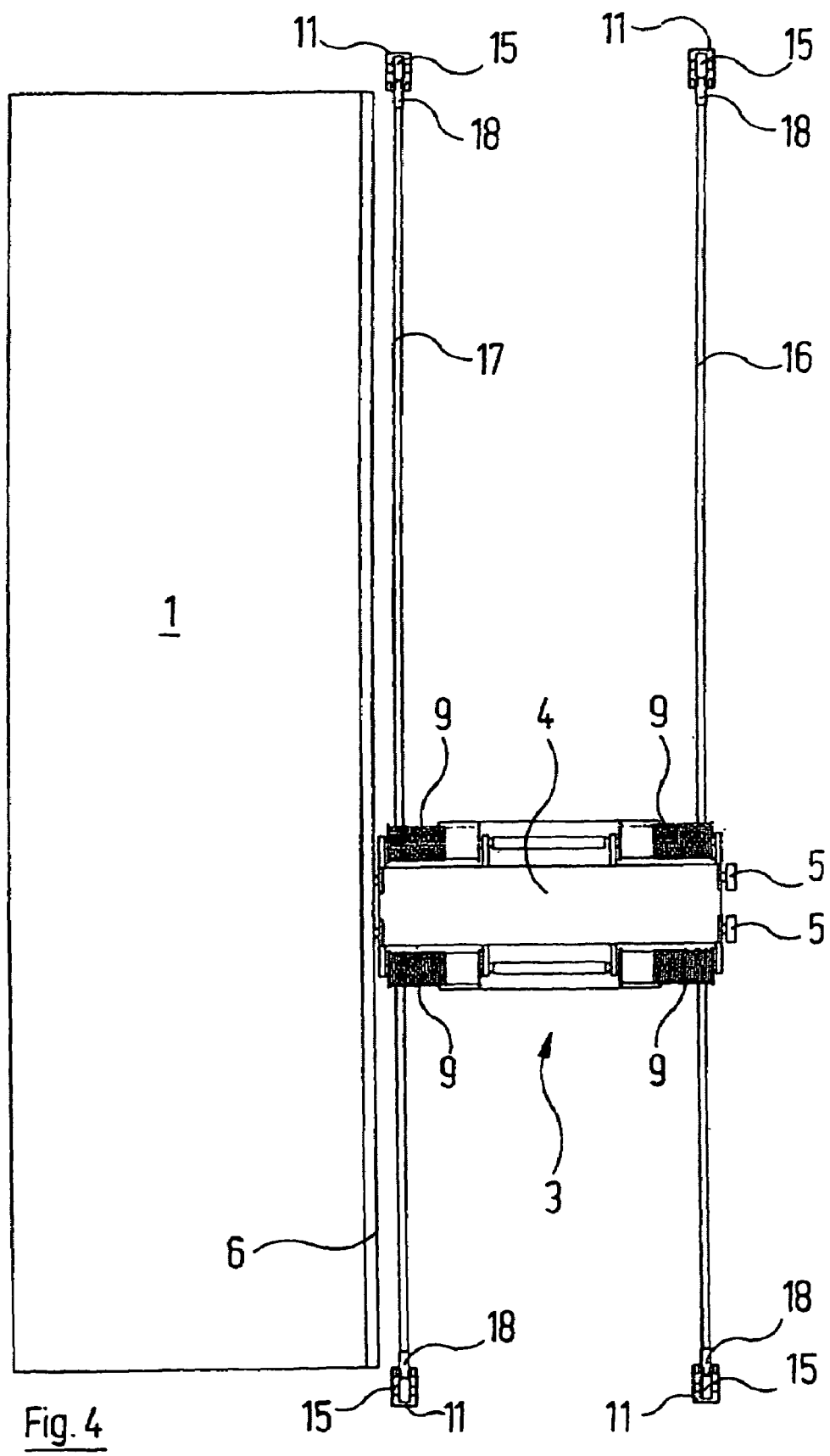
FIG. 4 a plan view of the rack serving unit in FIGS. 1 to 3.
Figure 5:
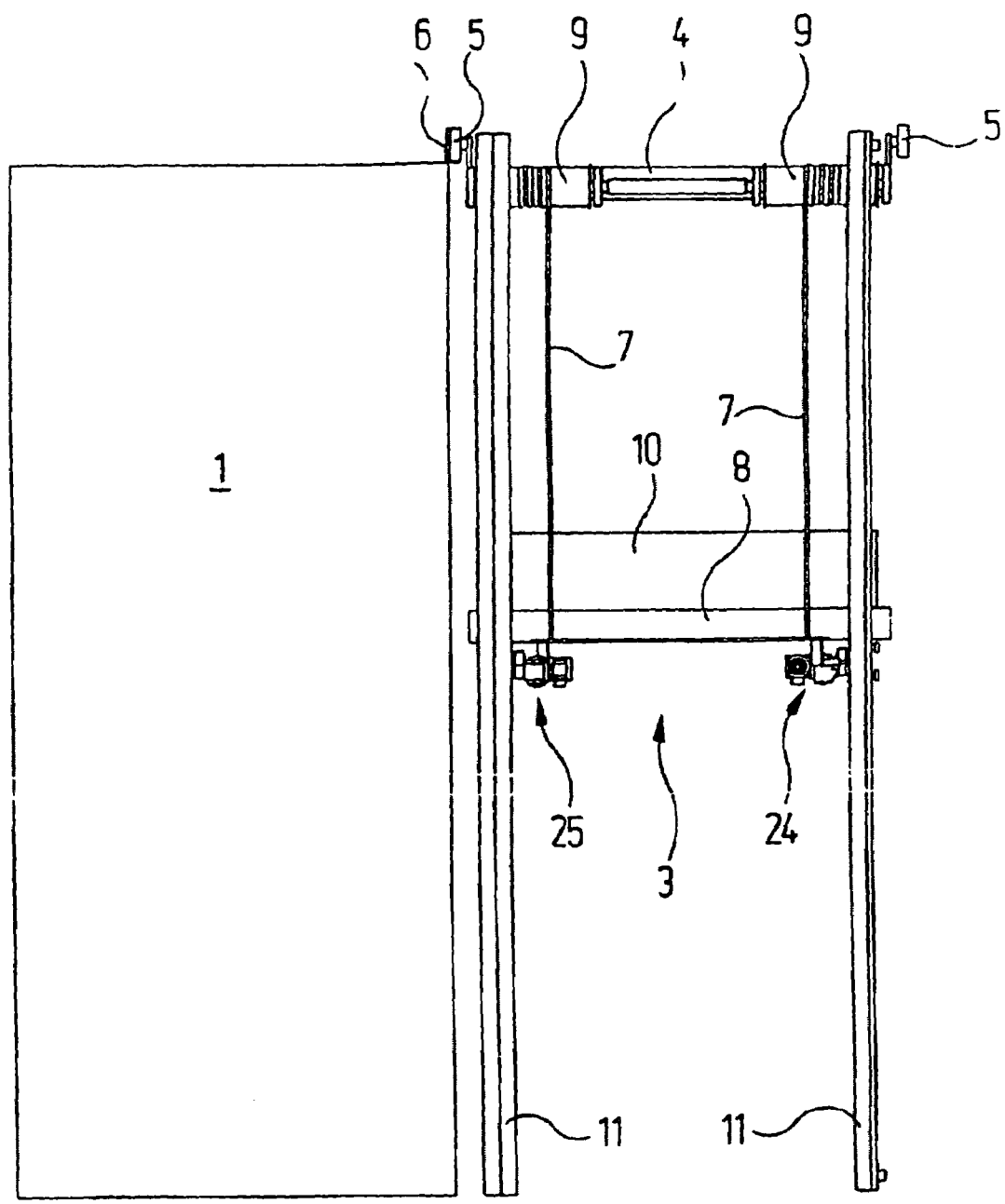
FIG. 5 an end view of the rack serving unit in FIGS. 1 to 4, seen from the left in FIGS. 1 and 3.

The rack serving unit 3 described above functions in the following manner:

It shall first of all be assumed that the lifting platform 8 is to carry out a straight horizontal movement to the right, for example from the position illustrated in FIGS. 1 to 3. To this end, the translatory drive of the carriage 4 starts functioning accordingly. At the same time, the system control supplies power to the geared motors 28, so that the lifting platform 8 is moved synchronously with the carriage 4 along the guide belts 16, 17, likewise to the right, the cables 7 and the guide belts 16, 17 maintaining their vertical alignment. An oscillating movement of the lifting platform 8 with respect to the carriage 4 is thus totally impossible.

If the lifting platform 8 is to be lowered from the position illustrated in FIGS. 1 to 3 in a purely vertical direction, the system control supplies power to the drives of the cable drums 9 accordingly, so that the free portions of the cables 7 become longer. At the same time, the idle rollers 14 are rotated by the system control in such a way that the inward-facing strands 13*b* of the continuous belts 13 move downwards synchronously with the lifting platform 8. During this procedure, there is no supply of power to either the translatory drive of the carriage 4 or the geared motors 28 of the clamp-roller drives 24, 25. The result is the desired straight vertical movement of the lifting platform 8, during which any lateral outward swing, and particularly oscillation, is reliably prevented by the guide belts 16, 17.

A general movement procedure of the lifting platform 8, during which this executes both a translatory and a vertical movement, is the result of superimposing the straight translatory and straight vertical movements described above, which means that a description thereof is unnecessary.

In one exemplary embodiment (not illustrated in the drawing), the flexible guide belts 16, 17 are replaced by relatively rigid rods or profiles. The mode of operation remains the same; nevertheless the guide rods or profiles are somewhat heavier than the guide belts 16, 17 used in the exemplary embodiment illustrated in the drawing. Instead of guide belts 16, 17, it is also possible to use guide cables, although these are not then tensioned continuously between opposing guide profiles 11 or the continuous belts 13 extending therein, but are instead interrupted in the region of the lifting platform 8 and may be wound onto cable drums there. As a result of supplying power to these cable drums accordingly, it is again ensured during a translatory movement of the lifting platform 8 that this latter always remains vertically below the carriage 4.

In an alternate embodiment of the present invention shown in FIG. 7, the rack serving unit has a guide element 16, 17 in the form of a continuous cable, which is tensioned between the two lifting devices. In the region located between the two lifting devices, this cable winds around a drivable cable drum 9' which is carried along by the lifting platform 8. It may be sufficient to guide this winding around only part of the circumference of the cable drum 9' if the friction between the outer surface of the cable drum and the cable 16, 17 is sufficient to substantially prevent slippage ("omega winding"). In many cases, it is however safer to wind the cable 16, 17 completely around the cable drum 9' one or more times.

During a translatory movement of the carriage, the cable drum is driven such that the lifting platform is pulled forwards on the cable synchronously with the carriage and the lifting platform always remains vertically below the carriage.

If the length of the high-bay rack 1, and therefore also the length of the guide elements 16, 17, is small, it is possible to dispense with a drive for the idle rollers 14 within the guide profiles 11.

The foregoing description merely explains and illustrates the invention and the invention is not limited thereto except insofar as the appended claims are so limited, as those skilled in the art who have the disclosure before them will be able to make modifications without departing from the scope of the invention.

The invention claimed is:

1. A rack serving unit having:
   a) a carriage which may be moved along a rack aisle by means of a drive on at least one substantially horizontal carrying rail;
   b) a lifting platform which is carried along by the carriage for the purpose of receiving goods from the rack;
   c) a lifting device by means of which the lifting platform may be moved in the vertical direction with respect to the carriage;
   d) a stabilising device which prevents the lifting platform from swinging out laterally, characterised in that
   e) the lifting device for the lifting platform comprises at least two traction mechanisms on which the lifting platform is suspended from the carriage
   f) the stabilising device comprises:
   fa) at least one guide element which extends substantially horizontally parallel to a translatory movement path of the lifting platform and with which the lifting platform is in constant engagement in such a way that its position in the direction of the translatory movement is constantly defined; and
   fb) provided at both ends of the translatory movement path of the lifting platform there is a lifting device for each guide element which is connected to the guide element and is constructed in such a way that the guide element moves synchronously with the lifting platform in the vertical direction in substantially horizontal alignment.

2. A rack serving unit according to claim 1, characterised in that the lifting platform is in engagement with the guide element by way of at least one clamp-roller drive having two clamp rollers which abut under pressure against opposite faces of the guide element and of which at least one may be driven such that the lifting platform executes a translatory movement synchronously with the carriage.

3. A rack serving unit according to claim 2, characterised in that the guide element is a flat belt.

4. A rack serving unit according to claim 2, characterised in that the guide element is a cable.

5. A rack serving unit according to claim 1, characterised in that the guide element is a cable wound with frictional fit around a driven cable drum attached to the lifting platform.

6. A rack serving unit according to claim 1, characterised in that the lifting device for the guide element comprises a continuous belt having a vertically extending strand to which a respective end of the guide element is fixed.

7. A rack serving unit according to claim 6, characterised in that the continuous belt may be driven.

8. A rack serving unit according to claim 6, characterised in that at least the vertically extending strand of the continuous belt is arranged within a vertically extending guide profile and is connected to the associated end of the guide element by way of a connecting device which has at least one guide roller, the guide roller rolling along an inner face of the guide profile.

9. A rack serving unit according to claim 1, characterised in that two guide elements extending parallel to one another are provided, which may be moved vertically such that they are synchronous with one another and with the lifting platform.

10. A rack serving unit according to claim 1, characterised in that the traction mechanisms on which the lifting platform is suspended from the carriage are flexible cables, belts or chains.

* * * * *